Figure 1:
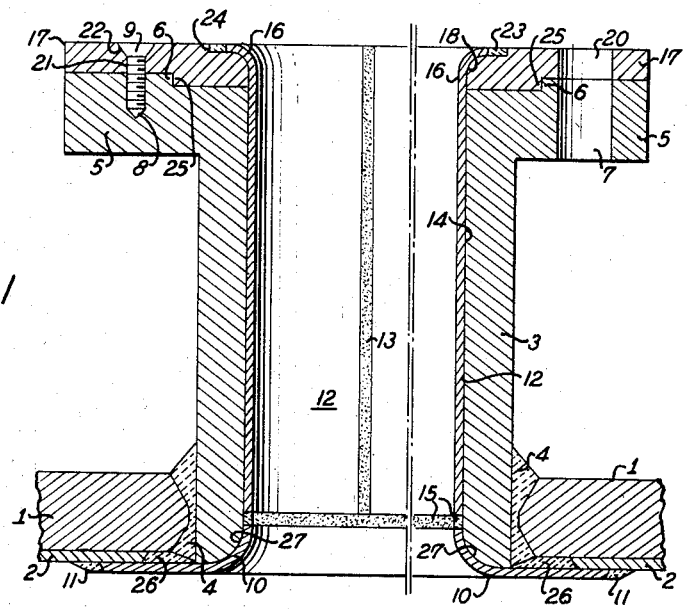

Oct. 31, 1967   O. A. PETERSON   3,349,951
CONNECTIONS FOR ALLOY LINED VESSELS
Filed Dec. 3, 1965

INVENTOR
OSCAR A. PETERSON
BY
Barry L. Evans
AGENT

United States Patent Office 3,349,951
Patented Oct. 31, 1967

3,349,951
CONNECTIONS FOR ALLOY LINED VESSELS
Oscar A. Peterson, Westwood, N.J., assignor, by mesne assignments, to Mid-Century Corporation, Chicago, Ill., a corporation of Delaware
Filed Dec. 3, 1965, Ser. No. 511,481
6 Claims. (Cl. 220—63)

This invention relates to the construction of pressure vessels. More specifically it relates to the construction of steel pressure vessels with alloy inner linings. Even more specifically this invention relates to a novel construction for lined vessel connections such as alloy-lined nozzles which insures an impervious lining and a tight mechanical construction.

In recent years chemical processes have been developed which employ highly corrosive chemicals and reagents and severe temperature and pressure conditions. The use of steel or alloy steel vessels having linings of corrosion resistant metals such as nickel, chromium and titanium has become commonplace. Less commonplace but of increasing importance are vessels having linings of such metals as zirconium, tantalum, hafnium and vanadium.

Many serious problems have been encountered in the development of lined pressure vessels. For example, loose liners may be effective to protect the steel outer vessel from corrosion but they are unsatisfactory where mechanical or heat transfer considerations require a close contact between the inner vessel and the outer vessel. Recently, effective procedures have been developed to permanently bond the chemically resistant inner linings to the outer steel vessel.

Titanium liners for example have been joined to steel vessels by an explosive bonding process developed by the Du Pont Company and described in their Patent No. 3,137,937. By means of the bonding process described in that patent it is possible to produce clad plate in which the titanium is metallurgically bonded to the steel backing. Such clad plates may be rolled or otherwise formed into the components of a pressure vessel and by means of titanium cover or batten strips, applied over welded seams in the steel backing plate, the titanium surface may be made continuous.

Although by this means it is possible to fabricate a vessel having a continuous inner surface of titanium there still remains the problem of extending this titanium surface through openings such as nozzles which are located in the vessel wall.

The practice in the past has been to weld into the hole prepared in the steel backing, a nozzle or "pad" of carbon steel into which has been inserted a formed sleeve or cylinder of titanium sheet. The top and bottom ends of this sleeve have then been welded to rings of titanium sheet, the outer one of which constituted the connection facing and the inner one of which was welded to the titanium vessel lining. This method of welding resulted in 90°, or right angle corners. The right angle weld has the disadvantage of constituting a site of high stress because of the geometry of the joint and the stresses applied. The high stress occurring at 90° corners is further enhanced by the differing thermal coefficients of expansion of titanium and steel, the coefficient of titanium being less than that of steel. When operating at elevated temperatures the titanium is forced by the steel to expand with the steel, thereby putting the titanium liner in tension and exerting high stresses on the corner welding. Failure in service of such joints has been a common experience; penetration and attack of the steel backing has resulted.

It is the purpose of this invention to provide a novel construction for lined nozzles so that mechanically reliable liners can be provided for clad vessels.

It is a further purpose of this invention to provide a lining construction which will withstand the stresses created by increases in the temperature of the clad vessel.

It is a further purpose of this invention to describe a method for constructing a nozzle on a clad vessel and subsequently lining that nozzle in order to form a continuous lining in the vessel and in the nozzle.

The novel construction which accomplished the purposes hereinabove set forth can most easily be described by reference to the attached drawing. FIGURE I shows a cut-away view of a typical nozzle on a titanium lined pressure vessel.

Figure 2:
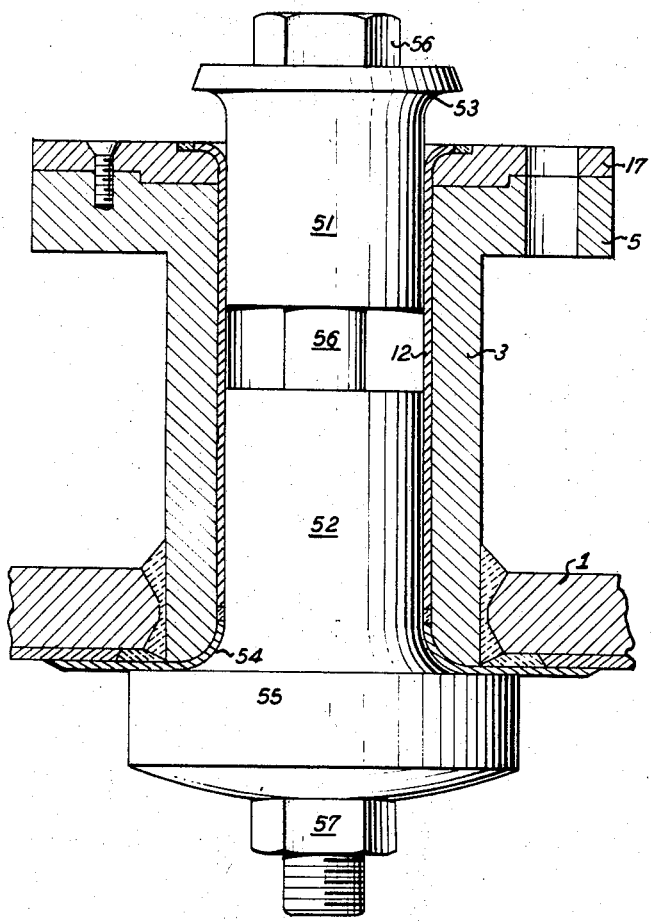

FIGURE 2 shows a cut-away view of the nozzle and liner sleeve with a press device for flueing the liner sleeve.

Numeral 1 identifies the outer steel vessel. Numeral 2 identifies the titanium inner lining which has been bonded to the steel outer vessel by, for example, the explosive bonding process. Numeral 3 identifies a steel connection of the nozzle type which is welded to vessel 1 at weld 4. A filler material 26 is provided between weld 4 and titanium flued inner ring 10. Nozzle 3 has flange section 5 provided with counterbore 6. Flange section 5 is further provided with bolt holes 7 for the purpose of joining to flange section 5 the mating flange of either another vessel, piping or other process equipment. Flange section 5 is likewise provided with threaded holes 8 for receiving screws 9 whose function is to tightly join facing plate 17 to flange section 5.

The bottom-most extension of the nozzle has outwardly curved surface 27. This surface is lined with flued inner ring 10 which is connected at its bottom-most extension by weld 11 to titanium liner 2. Flued inner ring 10 lies contiguous with surface 27 of nozzle 3 and is butt-welded to liner sleeve 12.

Liner sleeve 12, a cylindrical sheet of titanium joined at titanium weld 13 lies contiguous with inner surface 14 of nozzle 3. Liner sleeve 12 is joined to flued inner ring 10 at titanium weld 15. Liner sleeve 12 is provided with an outwardly flued outer extension 16.

Titanium facing piece 17 is provided with outwardly curved surface 18 and raised portion 24 and serves to cover the flange portion 5 of nozzle 3. A raised surface 25 is provided to mate with counterbore 6 on flange 5. Outer facing piece 17 is provided with bolt holes 20 and screw holes 21 which are countersunk as shown at 22. The purpose of the bolt holes is described above. The purpose of the screw holes 21 is to receive screw 9 which fastens facing piece 17 to flange 5.

The flued portion of the liner sleeve 16, lies contiguous with curved surface 18 of facing piece 17. The liner is joined to the facing piece at titanium weld 23.

The first step in preparing a vessel for attachment of a nozzle is to cut a hole equal to the outer diameter of the nozzle in the wall of the vessel. Once it has been done it is necessary to strip the cladding away from the circumference of the aperture for the reason that the cladding material would be contaminated if left in close proximity to the steel weld. Then the nozzle, which is of either mild or stainless steel depending upon the construction of the vessel itself can be welded to the sides of the aperture in the vessel wall. A filler material is provided as a means of continuing the surface between the cladding and the inner part of the nozzle.

A sheet of the linear material of a desired thickness is then worked into cylindrical form to become the liner sleeve of the nozzle. The edges of the shaped sheet are joined in a butt weld. A second sheet of the liner material in the shape of an annulus is flued in order to form the liner inner ring. The flued inner ring and the liner sleeve are butt welded and the whole assembly is put into the nozzle and welded to the titanium inner lining.

The facing piece is put in place and secured to the flange with screws. The top part of the liner sleeve is then flued so that it lies contiguous with the curved portion of the facing piece. This is accomplished by means of a press which at once holds the flued inner ring to the titanium liner, the liner sleeve to the wall of the nozzle and when pressure is applied bends the top part of liner sleeve to the shape of the curved portion of the facing piece. FIGURE II shows a typical device for accomplishing this purpose.

The press consists of cylindrical upper block 51 and cylindrical lower block 52. Upper block 51 has flued edge 53 for pressing the titanium liner sleeve into conformity with the edge of the titanium facing piece. Lower block 52 also has flued edges 54 which engage the flued inner ring. Both blocks have center bore 55 through which threaded bolt 56 is placed. By tightening nut 57 the two blocks can be brought closer together and the top edge of the liner sleeve can be pressed into shape.

The final step in preparing the lining is to weld the liner sleeve to the facting piece and machine the outer facing surface.

Other embodiments and modifications of this invention will be clear from the foregoing to those skilled in the art. It is intended to include within the scope of the invention all such embodiments and modifications except as do not fall within the scope of the appended claims.

What is claimed is:

1. A connection for a vessel having an alloy lining comprising the elements of:
   (1) a tubular connection, having a top side and a bottom side, attached at said bottom side to the vessel about an aperture in said vessel, and attached at said top side to a flange; and having an inner surface and an outer surface, said inner surface being curved outwardly at its bottom-most extension;
   (2) an alloy liner sleeve formed so as to lie contiguous with the inner surface of said tubular connection above the outwardly curved surface of said connection and having an outwardly flued top side extending above said connection;
   (3) an alloy flued inner ring formed so as to lie contiguous with the curved surface of said connection, welded at its bottom-most extension to the lining of said vessel and welded at its top-most extension to the liner sleeve; and
   (4) a facing piece, adapted to cover the flange part of the connection and having an outwardly curved surface adapted to lie contiguously with the flued portion of the liner sleeve and be attached thereto.

2. A vessel connection as recited in claim 1 wherein the connection is cylindrical in form, the liner sleeve is formed from sheet alloy and butt welded at a single seam and the flued inner ring is butt welded to the liner sleeve and the vessel lining.

3. A vessel connection as recited in claim 1 wherein the connection is a nozzle and the alloy is titanium.

4. A vessel connection as recited in claim 1 wherein alloy metal is stripped away from the perimeter of the aperture in the vessel, the connection is welded to the vessel wall at the perimeter of the aperture and a weld inlay of silver metal is applied to the perimeter of the aperture so that the alloy flued inner ring and the weld attaching the connection to the vessel are not in contact.

5. A vessel connection as recited in claim 1 wherein the flange of said connection has a counterbore and the facing piece has a raised surface adapted to mate with said counterbore thereby precluding lateral movement of said facing piece.

6. A vessel connection as recited in claim 1 wherein the flange of the connection has screw holes and the facing piece has countersunk mating screw holes adapted to receive screws which fasten the facing piece to the flange, thereby precluding upward movement of the facing piece.

References Cited
UNITED STATES PATENTS

| | | | |
|---|---|---|---|
| 2,916,182 | 12/1959 | Rollins et al. | 220—63 |
| 3,140,006 | 7/1964 | Nelison | 220—63 |
| 3,231,338 | 1/1966 | Andrus | 220—63 |
| 3,268,103 | 8/1966 | Nelson | 220—3 |

THERON E. CONDON, *Primary Examiner.*

G. T. HALL, *Assistant Examiner.*